US009666393B1

(12) United States Patent
Kowalik et al.

(10) Patent No.: US 9,666,393 B1
(45) Date of Patent: May 30, 2017

(54) HIGH VOLTAGE VERTICAL BREAK DISCONNECT SWITCH WITH BLADE POSITION DETECTOR AND ROLLOVER INDICATOR

(71) Applicant: CLEAVELAND/PRICE INC., Trafford, PA (US)

(72) Inventors: Peter M. Kowalik, Trafford, PA (US); Steven A. Cleaveland, North Huntingdon, PA (US); Joseph K. Andreyo, Irwin, PA (US)

(73) Assignee: CLEAVELAND/PRICE INC., Trafford, PA (US)

( * ) Notice: Subject to any disclaimer, the term of this patent is extended or adjusted under 35 U.S.C. 154(b) by 0 days.

(21) Appl. No.: 15/068,716

(22) Filed: Mar. 14, 2016

Related U.S. Application Data

(60) Provisional application No. 62/145,565, filed on Apr. 10, 2015.

(51) Int. Cl.

| | |
|---|---|
| ***H01H 31/00*** | (2006.01) |
| ***H01H 31/30*** | (2006.01) |
| ***H01H 31/02*** | (2006.01) |
| ***G06K 7/10*** | (2006.01) |

(52) U.S. Cl.
CPC ......... *H01H 31/30* (2013.01); *G06K 7/10366* (2013.01); *H01H 31/023* (2013.01); *H01H 31/026* (2013.01)

(58) Field of Classification Search
CPC ..... H01H 31/30; H01H 31/023; H01H 31/026
USPC ........................................................ 200/48 A
See application file for complete search history.

(56) References Cited

U.S. PATENT DOCUMENTS

| | | | | |
|---|---|---|---|---|
| 2,521,484 | A | 2/1947 | Schmidt | |
| 4,379,956 | A | 4/1983 | Cleaveland et al. | |
| 5,382,764 | A * | 1/1995 | Demissy | H01H 31/283 200/48 R |
| 5,560,474 | A * | 10/1996 | Thomas | H01H 31/00 200/48 A |
| 5,874,900 | A | 2/1999 | Panto | |
| 6,538,206 | B1 * | 3/2003 | Roberts | H01H 31/023 174/138 G |
| 7,091,431 | B1 * | 8/2006 | Arcand | H01H 1/42 200/48 R |
| 7,626,287 | B2 * | 12/2009 | Sanders | H01H 9/16 307/134 |
| 8,451,098 | B2 | 5/2013 | Posamentier | |
| 2006/0138088 | A1 * | 6/2006 | Meinherz | H02B 5/06 218/119 |
| 2009/0020400 | A1 * | 1/2009 | Haster | H01H 3/56 200/331 |

(Continued)

*Primary Examiner* — Kyung Lee
(74) *Attorney, Agent, or Firm* — Ronald S. Lombard

(57) ABSTRACT

A blade position detector and rollover indicator is operatively attached to an elongated movable switch-blade assembly of a horizontally mounted high voltage vertical break disconnect switch. The blade position detector and rollover indicator is gravity responsive and attached in predetermined position to the elongated disconnect blade assembly that reacts when the proper angle of closure of the blade is obtained in an intermediated closed switch position and finally when the proper angle of blade rollover is obtained in a fully closed switch position to provide a visual indication of full closure of the disconnect switch.

48 Claims, 10 Drawing Sheets

(56) References Cited

U.S. PATENT DOCUMENTS

| | | | | |
|---|---|---|---|---|
| 2014/0048396 | A1* | 2/2014 | Sotnikov .................. | H01H 1/42<br>200/48 KB |

* cited by examiner

POSITION 1

POSITION 3

HIGH VOLTAGE VERTICAL BREAK DISCONNECT SWITCH WITH BLADE POSITION DETECTOR AND ROLLOVER INDICATOR

CROSS-REFERENCE TO RELATED APPLICATION

This is application claims the benefit of U.S. Provisional Application No. 62/145,565 filed Apr. 10, 2015, which is incorporated herein by reference in its entirety.

BACKGROUND OF THE INVENTION

The invention relates generally to a vertical break disconnect switch for high voltage applications and, more particularly, to a horizontally or underhung mounted vertical break disconnect switch including apparatus for detecting that the switch blade has closed properly into its corresponding parting contacts, i.e., the break jaws.

In electric power systems, high voltage disconnecting switches are employed to isolate transmission lines and high voltage electrical apparatus to permit the inspection or repair of such apparatus or redirect power or other reasons. High voltage vertical break disconnect switches are a type of high voltage disconnecting switch that typically have relatively long and some what flexible switch blades that are prone to suffer from wear, from improper installation, from weathering or from improper or incomplete operation, thereby causing the switch blades to not fully seat in their parting contacts, i.e., break jaws, for proper full-rated current carrying capability. From ground level, a utility operator may not be able to see whether proper closure of the vertical break disconnect switch has occurred with full seating of a switch blade contact portion within the oppositely disposed break jaw contacts and remote closure by a motor operator offers no ability to review the correctness of the closure before energization.

High voltage vertical break disconnect switches, including horizontally mounted high voltage vertical break switches are characterized by the elongated switch blade when closing to first swing about a stationary pivot at the proximal end of the blade in a first switch closing operation and subsequently rotate about its own axis in a second switch closing operation. A reverse operation of the switch takes place during opening. As such a horizontally mounted vertical break disconnect switch blade when closing in the first switch closing operation first swings about a stationary pivot from a vertical orientation to a horizontal orientation where an elongated blade contact portion or tip carried at the distal end of the switch blade comes into first contact with a break jaw stop of the break jaw assembly at an intermediate closing position of the switch. The switch blade then, in the second switch closing operation, rotates about its own longitudinal axis between the parting contact jaws, with the blade tip's side edges forcing the parting contact jaws to spread until desirably full contact with the oppositely disposed break jaws is accomplished in the final closing of the switch. The side edges of the blade contact portion or tip at full contact are typically about horizontal when in full contact with the contact fingers of the break jaws. A basic patent for such a high voltage vertical break switch is disclosed in U.S. Pat. No. 2,521,484, by Frederick G. Schmidt, issued Sep. 5, 1950. U.S. Pat. No. 4,379,956 by Charles M. Cleaveland, et al. issued Apr. 12, 1983, discloses an improved switch-jaw construction for a disconnecting switch have a tie-rod assembly interconnecting the free ends of the confronting switch jaw of the type that may be used in such high voltage vertical break switches. The said U.S. Pat. No. 4,379,956 is incorporated herein by reference as though fully set forth.

U.S. Pat. No. 5,874,900 by Andrew S. Panto issued Feb. 23, 1999, discloses a fairly complex monitoring system for an overhead power line switch which includes electronic sensors for monitoring critical switch adjustment dimensions, switch position, switch status and other switch parameters. In one embodiment the electronic sensors are positioned to sense at least one of whether the contact blade is toggled closed position or a switch-open position, whether the contact blade is aligned with the clip assembly, the contact blade depth in the clip assembly. The monitoring system is preferably provided with a remote terminal unit delivering sensor data to a remote operating facility.

It is therefore an object of the present invention to provide a horizontally mounted high voltage vertical break disconnect switch with a simple reliable apparatus for providing a positive indication when the blade tip of such a switch has come into full contact with the oppositely disposed break jaws.

SUMMARY OF THE INVENTION

The present invention provides for an improved high voltage vertical break disconnect switch with a blade position detector and rollover indicator. The present invention fulfils the long felt need in the utility industry for a high voltage vertical break disconnect switch that provides verification that a switch blade has closed properly into its parting contacts, i.e., the break jaws. A horizontally mounted vertical break disconnect switch-blade assembly is disclosed with an easily viewed gravity responsive indicator in one embodiment. The indicator is attached in predetermined position to the disconnect blade assembly and reacts when the proper angle of closure of the blade is obtained at the intermediate closing position of the switch and finally when the proper angle of rollover or complete rollover is obtained upon full closure of the switch.

A horizontally mounted vertical break disconnect switch blade initially closes by swinging vertically about a stationary pivot point from a vertical orientation to a horizontal orientation in a first switch closing operation. The blade contact portion must reach a certain position or depth in its mating contact, i.e., the break jaw assembly, which occurs upon the blade contact portion first contacting the break jaw stop. This is called the angle of closure at the intermediate closing position of the switch. The angle of closure occurs before the switch blade in the second switch closing operation begins to rollover or rotate about its own longitudinal axis to develop full contact pressure upon full closing of the switch. The disconnect switch blade must rollover completely to develop full contact pressure with the oppositely disposed break jaw fingers for full closing of the switch. This is called the proper or predetermined angle of rollover of the switch blade. The rollover indicator of the present invention desirably includes a spherical ball that rolls on a hidden pathway upon certain conditions occurring. The indicator is configured so that the ball only becomes visible or causes a signal to be sent to utility operators when the switch operations of the proper angle of closure of the blade at the intermediate closing of the switch and the proper angle of rollover when full electrical contact has been made by a blade tip with the break jaw fingers upon full closing of the switch have occurred. Thus, a ball rolling in a clean enclosed weatherproof housing which moves at the slightest non-horizontal angle is a feature of this invention. This aspect of the invention provides extreme sensitivity to verify correct angles of closure at the intermediate closed position of the switch and rollover of the blade at the fully closed position versus incorrect ones.

The enclosed weatherproof housing of the indicator is preferably molded from various weather resistant plastics, or from glass or from metal. The spherical ball is preferably colored. For example, the ball may be stainless steel and colored green or it may be an iridescent glass marble. In one embodiment the ball is electrically conductive. The ball is preferably hidden by an opaque color everywhere around the housing except for the final position which is provided with a window to allow viewing of for example ½ to ¾ of the whole ball. In the alternative or in addition to visual observation by a utility worker of the ball in the window, the ball may be electrically or optically detected by a self-sensing ball detector-indicator when the blade is in the final position.

The housing of the blade position detector and rollover indicator of the present invention desirably has an "L-shape" and is closed at both ends. Preferably, the blade position detector and rollover indicator housing has a first leg which can be a long leg and a second leg which can be a short leg. The first leg encloses a first portion of the hidden pathway and the second leg encloses a second portion of the hidden pathway. The first portion of the hidden pathway is longer than the second portion of the hidden pathway. Although it is possible for both legs to be about the same length, care must be exercised though, because of the chance of a corona discharge developing as a result of the leg positioned perpendicular to the surface of blade being too long. Such blades can carry 600 to 6000 amperes and be from 2 feet to 23 feet long and from 2 inches to 7 inches in diameter. Large voltages require that the leg perpendicular to the longitudinal axis of the blade, i.e., the short leg, be kept short to reduce the chance of corona discharge developing as a result of the perpendicular leg extending from an otherwise smooth surface. The L-shaped indicator is preferably mounted in one embodiment with the long leg directly attached to the switch blade. In a top mounted installation, the long portion of the hidden pathway is operatively positioned nearer the hinge end of the horizontally mounted vertical break disconnect switch, i.e., where the insulators are positioned below the blade. The longitudinal axis 'X' of the long portion of the hidden pathway is mounted at a first predetermined angle θ with respect to the longitudinal axis 'L' of the switch blade. The switch blade typically is an elongated tubular blade. In this type of switch installation, the ball stays in the first closed end of the long leg until the blade has reached the proper angle of closure indicating proper depth in the mating break jaw contact assembly, i.e., the blade contact portion first contacts the break jaw stop. Desirably the long portion and the short portion of the pathway are substantially perpendicular and intersect one another at a vertex 'V' in the hidden pathway. The ball in the first operation of the switch, during closing of the switch, initially rolls in the hidden pathway due to gravity proceeding through the long portion to the vertex, but still is not visible, until the blade in the second switch closing operation now begins to roll over. This point in the switch operation is called the intermediate closed position. The ball reaching the intermediate closed position is caused by the vertical swinging movement of the switch blade about a pivot point. The ball remains at the vertex 'V' in the hidden pathway in the intermediate closed position until the second switch closing operation of the switch is completed, i.e., where the blade is caused to rotate, i.e., rollover, about its own longitudinal axis and the angle of rotation of the blade about its own longitudinal axis is reached and complete rollover of the blade occurs which makes the short portion of the hidden pathway tilt downhill. The ball will then roll downhill due to gravity to a second closed indicator end of the housing in the short leg and be visible in the window, if provided, which may be for example an integral transparent or translucent portion of the housing or opening in the housing which indicates that the blade contact portion is fully seated between the break jaw contacts and the switch is in the full closed switch position. This same position detector and rollover indicator will also work for an underhung horizontally mounted vertical break switch, i.e., where the insulators are arranged above the blade, as long as the indicator is mounted on the blades so that the first closed end of the long leg of the indicator points away from the hinge which is the pivot point of the vertical break disconnect switch. The position detector and rollover indicator in this configuration is also mounted with the longitudinal axis of the long portion of the hidden pathway mounted at a first predetermined angle θ with respect to the longitudinal axis of the switch blade.

The outside surface of the housing, in one embodiment, is preferably shaped to allow it to be strap clamped to any horizontally mounted vertical break disconnect switch blade to allow it to be adjusted to cause the ball to become visible in the window at the second closed end of the housing only when both the proper angle of closure and the proper angle of rollover are met. A hose clamp such as a screw clamp may be used. The blade position and rollover indicator may be part of a new switch installation or may be retrofitted to an existing switch installation. In another embodiment instead of the housing being directly strap clamped to a switch blade of a horizontally mounted vertical break disconnect switch, an adjustable mounting bracket assembly is disclosed subsequently which permits the aforesaid adjustments for proper rolling of the ball to be accomplished by making adjustments between the adjustable mounting bracket assembly components after attaching the adjustable mounting bracket assembly to the switch blade in predetermined position when the switch is in the fully closed position. The adjustable mounting bracket assembly includes a saddle bracket which supports the housing of the blade position detector and rollover indicator. The saddle bracket is carried on a base bracket which is strap clamped to the switch blade via the hose clamp. The saddle bracket secures the long leg of the blade position detector and rollover indicator and is releasably engaged with the base bracket so that the proper angle of closure, i.e., predetermined angle of closure may be set. An upper bracket releasably secures the housing in the saddle bracket but permits adjustment of the position of the short leg for the proper rollover angle.

The blade position and rollover indicator, as an alternative to being arranged for a visible observation by a utility operator of the ball being in the window, may also be configured by the addition of an RFID tag to it, so that the ball rolling in the hidden pathway to the final correct closed position at the second end of the housing will add to the transmissibility of the tag and show as a "read" by a reader mounted below at ground level. The ball in any other position would preclude reception of power from the reader and therefore not return a coded message. The reader then may drive a status indicator in a control room to show whether proper closure of the switch was achieved or not. Alternatively, instead of an RFID tag, the indicator could be read by means of a radio transmitter/receiver arrangement. A low wattage battery powered radio transmitter integrated into the indicator could detect contact closure as the ball rolls to its final position at the second closed end of the housing and relays that information to the receiver in the control room. Also, fiber optics could be used instead to detect the ball at the second closed end of the housing when the switch is in the fully closed position and relay that information to the control room. With these embodiments, i.e., RFID, radio or fiber optics, the window may not be necessary, but still may be desirable for the possibility of visual inspection.

These and other aspects of the present invention will be further understood from the entirety of the description, drawings and claims.

BRIEF DESCRIPTION OF THE DRAWINGS

For a better understanding of the invention reference may be made to the accompanying drawings exemplary of the invention, in which.

DETAILED DESCRIPTION OF THE VARIOUS EMBODIMENTS

Figure 1C:
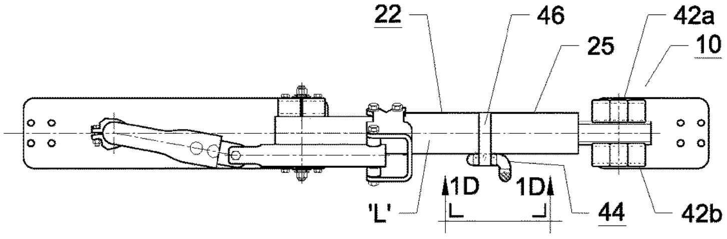
FIG. 1C is a plan view of the switch shown in FIG. 1A.
Figure 1A:
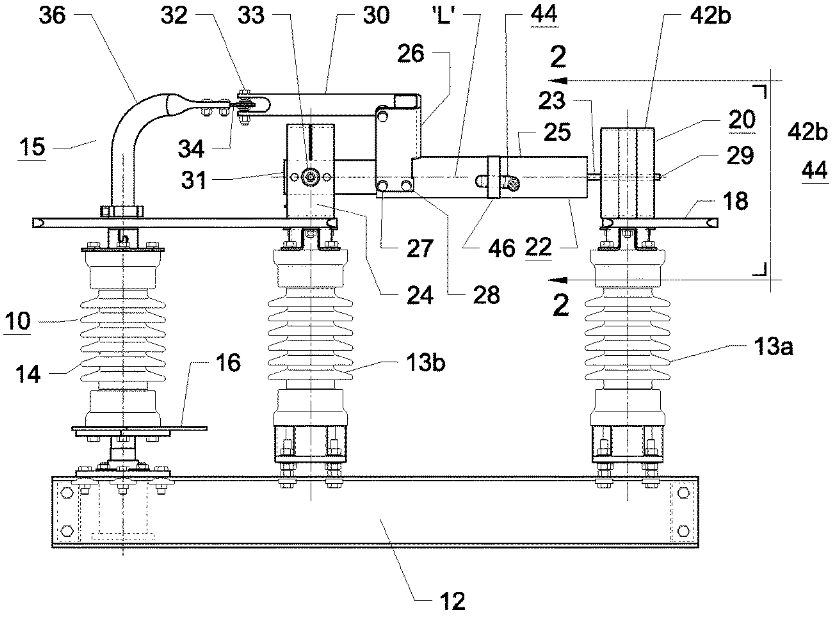
FIG. 1A is an elevation view of a horizontally mounted vertical break disconnect switch in the full closed position with attached rollover indicator of the present invention.
Figure 1B:
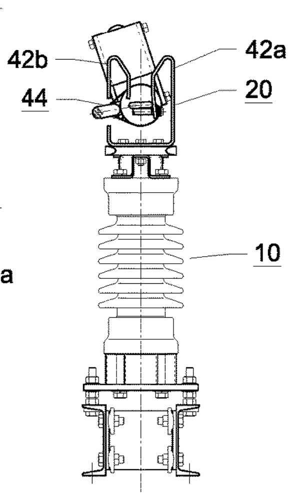
FIG. 1B is a right side elevation view of the switch shown in FIG. 1A.
Figure 2:
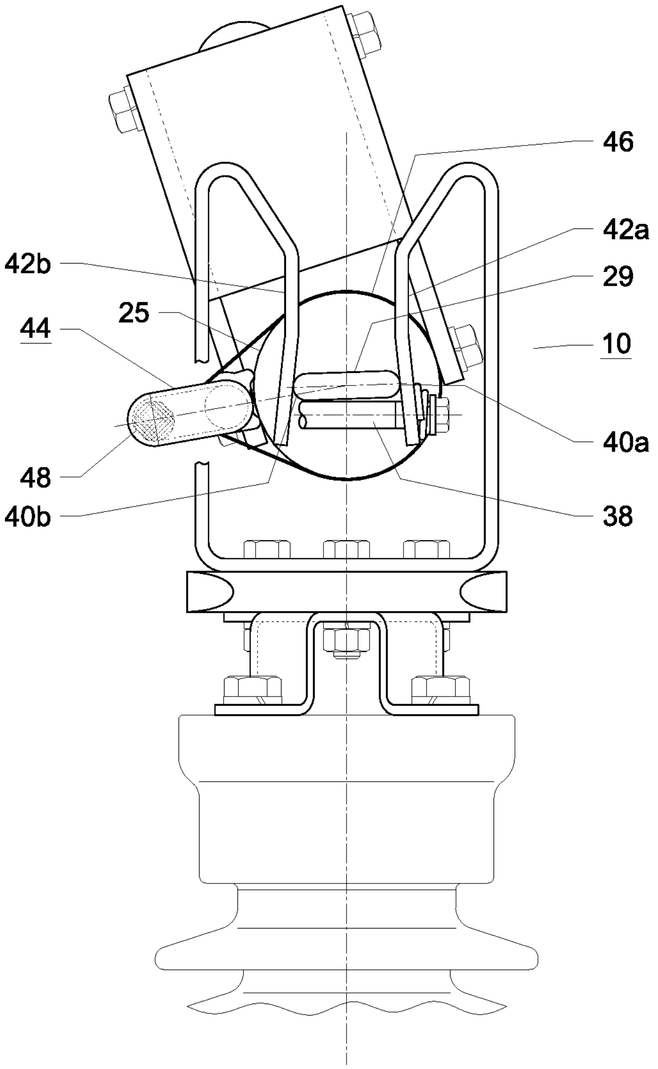
FIG. 2 is an enlarged right side elevation view taken along the section line 2-2 of FIG. 1A.

With reference to FIGS. 1A, 1B, 1C, and 2, a horizontally mounted high voltage vertical break disconnect switch 10 is shown in a full closed position mounted to the top of a horizontal beam 12 of inverted channel shape construction. The switch 10 includes three vertically mounted post-type insulators, 13*a*, 13*b* and 14. A first post insulator 13*a* and a second post insulator 13*b* are stationary and are mounted as shown in FIG. 1A. The switch 10 includes a drive arrangement 15, where the third post insulator 14 is rotatable and has a lever handle 16 attached at the bottom. This enables the third post insulator 14 to be rotated either manually by rotating lever handle 16 or by a motor, not shown, to cause the switch 10 to open or close as desired. At the top of the first post insulator 13*a* is attached a line-terminal connection 18 and also a stationary break-jaw contact assembly 20. The break-jaw contact assembly 20 may be U-shaped, such as shown in FIG. 2. Making electrical contact with the stationary break-jaw contact assembly 20, when the switch 10 is closed, is an elongated movable switch-blade assembly 22, the latter being pivotally mounted about a hinge assembly 24. The general details of this arrangement are apparent by reference to FIG. 1A. The elongated switch-blade assembly 22, includes an elongated switch blade 25, which may be tubular for example, which at the distal end 23 thereof a switch blade contact portion such as a relatively flat switch blade tip 29 is attached having an approximate rectangular cross-section being curved at the edges as shown in FIG. 2.

As shown in FIG. 1A, the first post insulator 14 is capable, as mentioned, of rotary operative motion for driving the switch-blade assembly 22. To mechanically interconnect the operation of the elongated movable switch-blade assembly 22 with rotation of the first post insulator 14, the drive arrangement 15 also includes a movable blade-arm 26, which may be secured by a pair of mounting bolts 27 and 28, to the horizontally extending movable switch-blade assembly 22. At the upper end of the movable blade-arm 26, is pivotally connected a link 30 by means of a pivot pin 32.

Figure 3B:
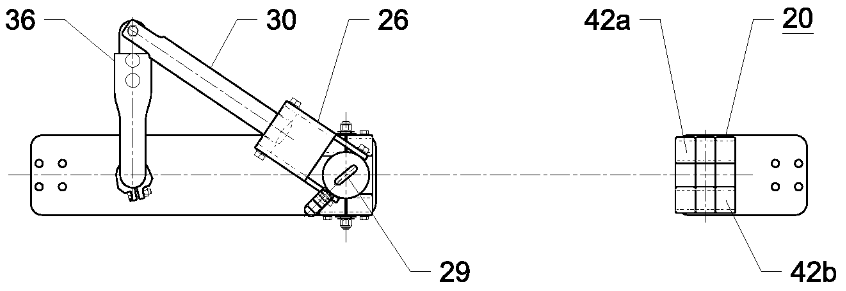
FIG. 3B is the same as FIG. 1C with the switch in the open position.
Figure 3A:
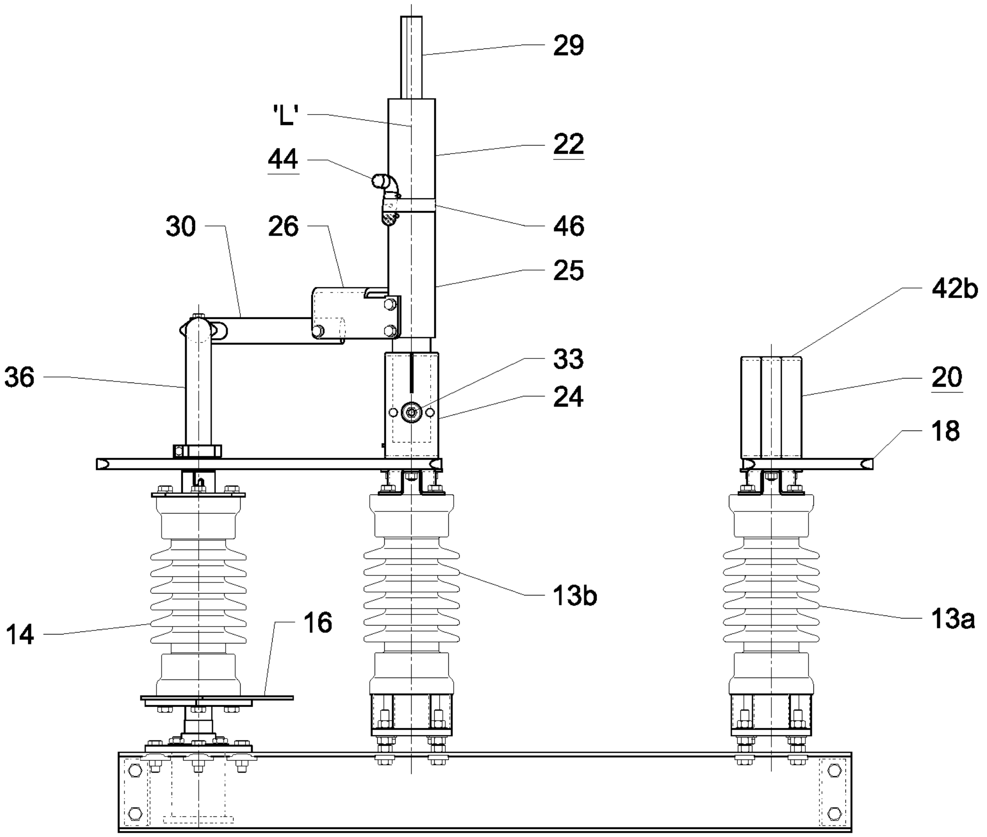
FIG. 3A is the same as FIG. 1A with the switch in the open position.
Figure 5C:
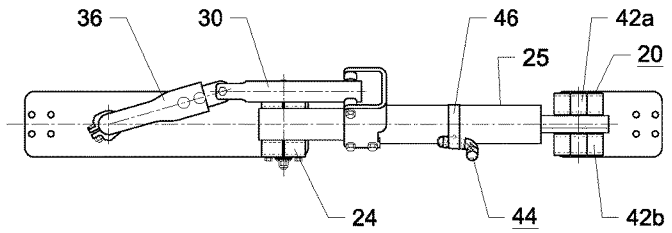
FIG. 5C is the same as FIG. 1C but with the switch in an intermediate closed position.
Figure 5B:
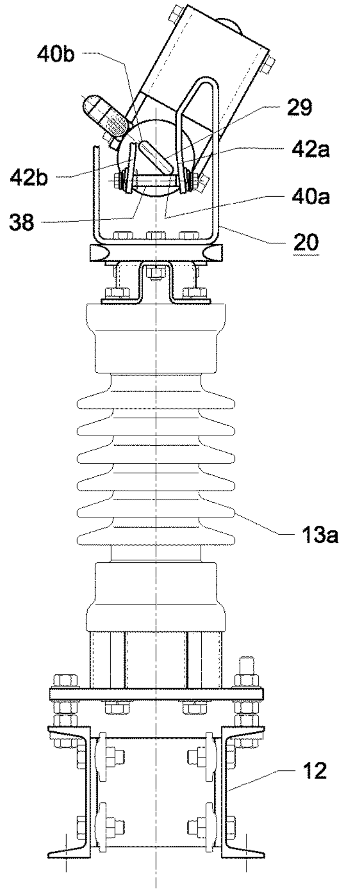
FIG. 5B is the same as FIG. 1B but with the switch in an intermediate closed position.
Figure 5A:
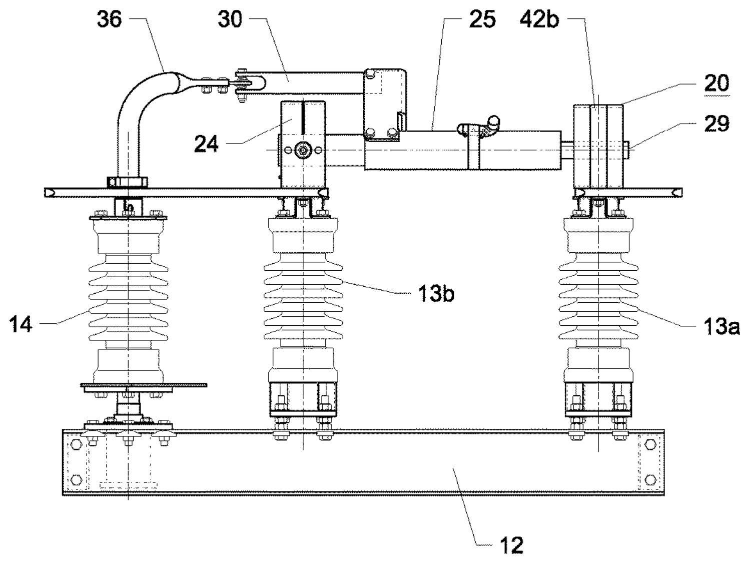
FIG. 5A is the same as FIG. 1A but with the switch in an intermediate closed position.
Figure 6A:
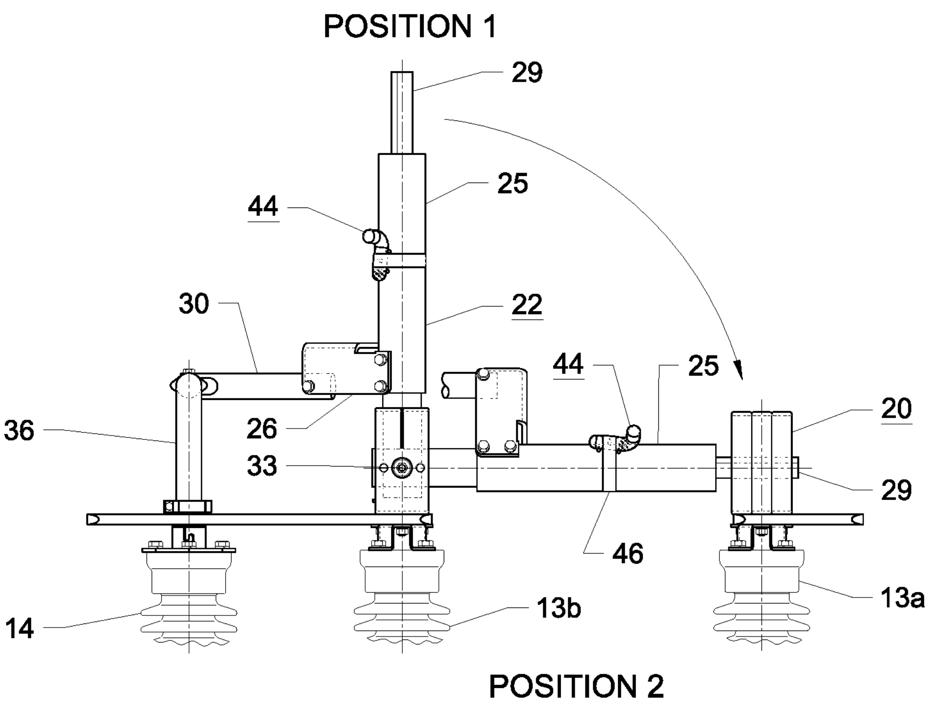
FIG. 6A is the same as FIG. 5A but showing the switch instead in an open position and in the intermediate closed position.
Figure 6B:
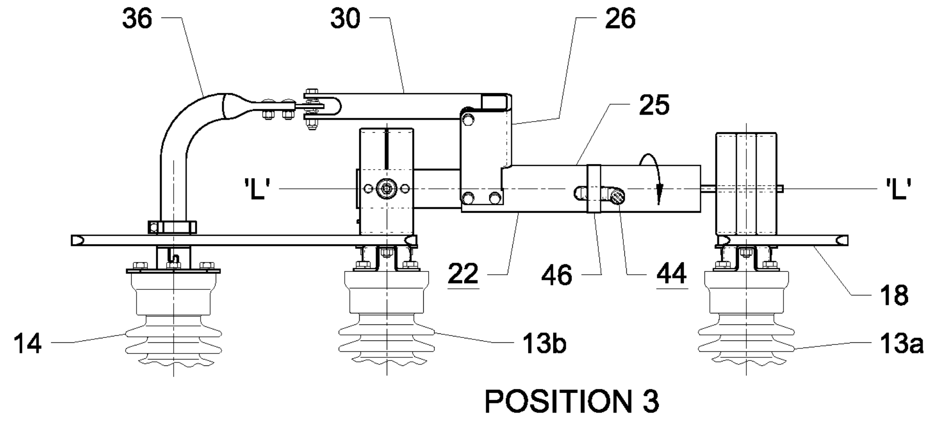
FIG. 6B is the same as FIG. 1A showing the switch in the full closed position

A tongue member 34 operatively engages a movable tubular crank-member 36, which is, as mentioned, rotated by the operating motion of the rotatable third insulator 14. With reference to FIG. 6A, during closing of the switch 10, the movement of the rotatable insulator 14 initially causes the elongated moveable switch-blade assembly 22 to pivot about the axis 33 of the hinge assembly 24 the proper angle of closure, as indicated by the arrow in FIG. 6A, from vertical Position 1 to horizontal Position 2, which may be an angle of about 90° as shown in FIG. 6A, resulting in the switch 10 being in an intermediate closed position as shown in FIGS. 5A, 5B, 5C. As can be seen in FIG. 5B, the flat switch blade tip 29 or blade contact portion in the intermediate closed position enters the break jaw contact assembly 20 which includes a pair of break jaws 42*a*, 42*b*. One edge 40*a* of the switch blade tip 29 is forced against break jaw stop 38 while also contacting one of the break jaws or fingers 42*a*. The other opposite edge 40*b* of flat blade switch tip 29 is forced against the second of the break jaws or fingers 42*b* as shown in FIG. 5B. As can be seen in FIG. 5B, the switch blade tip 29 is diagonally positioned between jaw fingers 42*a*, 42*b*, in the intermediate closed position of the switch, which is position 2 in FIG. 6A. As can be seen in FIG. 5B, the blade tip 29 is not making full closed contact with the opposing jaw fingers 42*a*, 42*b* in the intermediate closed position. It is not yet in the final horizontal position between the opposing contact jaw fingers 42*a*, 42*b* which occurs after the second switch closing operation. To effect the full closed position for the switch blade contact portion 29 in the second switch closing operation, the rotatable insulator 14 is caused to rotate by the lever handle 16 and the elongated movable switch-blade assembly 22 is also caused to rotate from the intermediate position to the full closed position, i.e., Position 3. The movable tubular crank-member 36, enabled by the movement of the lever handle 16, causes the elongated movable switch-blade assembly 22 to rotate through a the proper or predetermined angle of rollover of about 45 degrees about its own longitudinal axis 'L' as indicated by the arrow in FIG. 6*b*. This movement can be called a rollover movement. At this point, full closed electrical contact of the switch 10 is effected by the switch blade tip 29 being substantially horizontally arranged between the break jaw fingers 42*a*, 42*b* with its edges 40*a*, 40*b* in maximum electrical contact with the break jaw fingers 42*a*, 42*b*, as can be seen in FIGS. 1A, 1C, 1B, 2, and 10 for example. With reference to FIGS. 3A and 3B, the horizontally mounted vertical break disconnect switch 10 is shown in the full open switch position with the elongated switch-blade assembly 22 oriented vertically with no electrical contact being made between the switch-blade assembly 22 and the break jaw contact assembly 20.

Figure 1D:
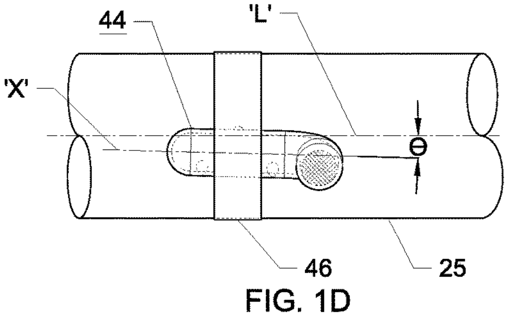
FIG. 1D is an enlarged bottom view taken along the section line 1D-1D in FIG. 1C.

The horizontal vertical break switch 10 as described thus far is conventional and well known in the industry. The present invention provides a blade position and rollover indicator 44 for reacting to gravitational force both during switch closing in the first operation of the switch 10 when the proper angle of closure of elongated tubular movable switch-blade assembly 22 is obtained in the intermediate closing position of the switch 10 when the switch blade contact portion or tip 29 first contacts the break jaw stop 38 as shown in FIG. 5B, and in the second subsequent operation of the switch 10, when the proper angle of rollover of the elongated tubular movable switch-blade assembly 22 is obtained upon full closing of the switch 10. The housing 52 of the indicator 44, in one embodiment, is operatively attached to the elongated switch blade 25 by a strap clamp 46 in predetermined position when the switch 10 is in the fully closed position, as shown for example by reference to FIGS. 1A, 1D, 2, 10. A hose clamp such as a screw clamp may be used as the strap clamp 46. The housing 52 of the blade position detector and rollover indicator 44 desirably has an "L-shape" housing 52 that is closed at both ends 58*a*, 58*b*. The housing 52 encloses a ball 48 rolling in a substantially hidden pathway 50 including a first or long portion 55 of the pathway 50 and a second or short portion 57 of the pathway 50. The long leg, i.e., first leg, 54 of the "L-shaped" housing 52 of the indicator 44 enclosing the long portion 55 of the hidden pathway 50 having a longitudinal axis 'X' which is arranged at a first predetermined angle θ with respect to the longitudinal axis 'L' of the switch-blade assembly 22 as shown in FIG. 1D. The first predetermined angle θ maybe about 0.50 to about 1.50 degrees and permits the ball 48 to roll downhill in the pathway 50 until it reaches a vertex 'V,' as described subsequently in more detail. This occurs when the proper angle of closure of the switch blade assembly at the intermediate closing position of the switch 10 has been obtained. The long leg 54 of the housing 52 may be about three inches in length and the short leg 56 may be about 1.25 inches in length. The switch blade 25, as mentioned previously, is typically elongated and may be tubular. The hidden pathway 50 is configured so that the ball 48 only becomes visible in a window 61, which may be transparent and integral with a clean enclosed weatherproof housing 52, when the pathway 50 in the housing 52 is at the proper angle of closure of the blade and at the proper angle of rollover, as described previously, i.e., indicating that the flat switch blade tip 29 is in the full closed position. This ensures that the switch blade tip 29 is making full electrical contact with the break jaw contact assembly 20. The ball 48 rolling in a clean enclosed weatherproof housing 52 will move due to the influence of gravity at the slightest non-horizontal angle with reference to the longitudinal axes of the two portions of the legs of the L-shaped housing 52. This property gives the present invention extreme sensitivity to verify correct angles of closure and rollover of the blade versus incorrect ones.

The enclosed weatherproof housing 52 of the present invention can be molded from various weather resistant plastics, from glass or from metal. The ball 48 can be colored. For example, the ball 48 may be stainless steel and colored green or it may be an iridescent glass marble. The ball 48 can be hidden by an opaque color everywhere around the housing except for the final position which is set to allow viewing by a utility operator of for example ½ to ¾ of the whole ball 48.

Figure 4A:
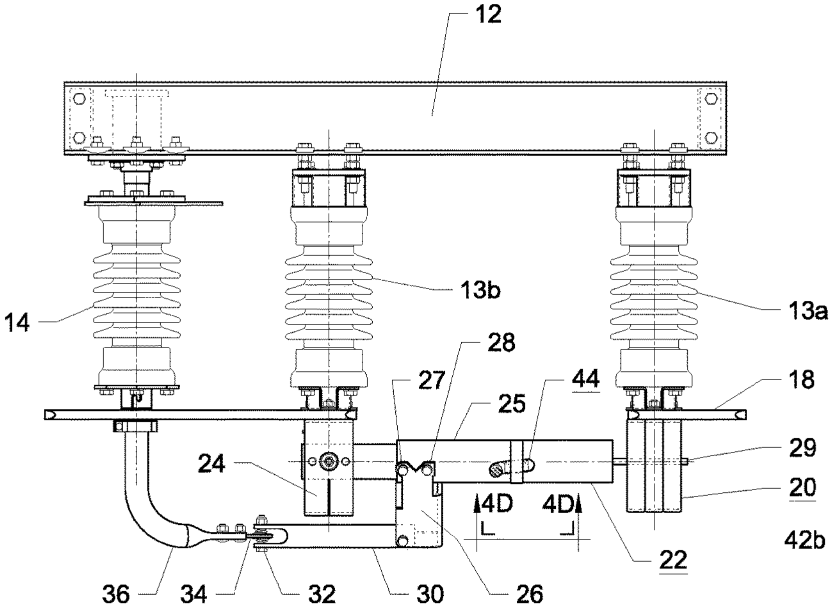
FIG. 4A is an elevation view of an underhung horizontally mounted vertical break switch in the full closed position with attached rollover indicator of the present invention.
Figure 4B:
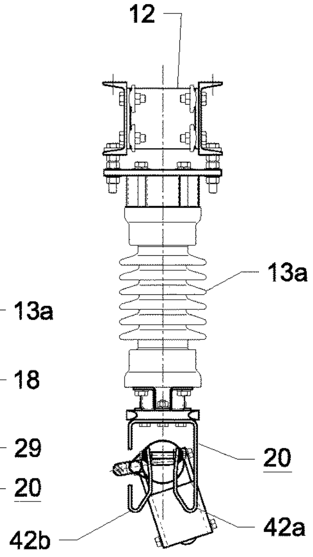
FIG. 4B is a right side elevation view of the switch shown in FIG. 4A.
Figure 4C:
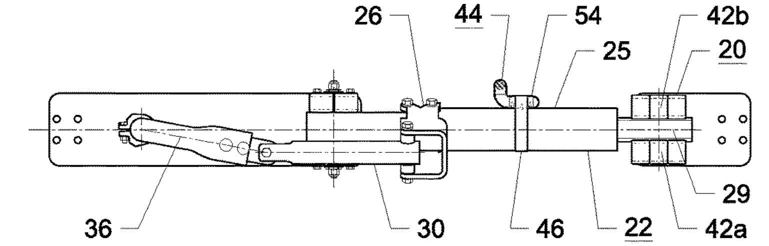
FIG. 4C a bottom view of the switch shown in FIG. 4A.
Figure 4D:
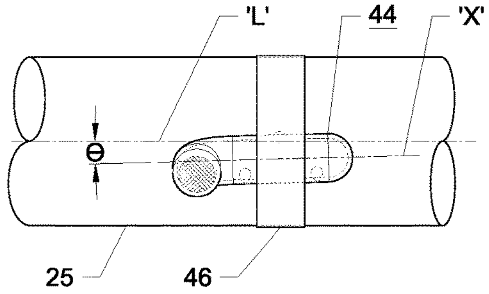
FIG. 4D is an enlarged bottom view taken along the section line 4D-4D in FIG. 4A.
Figure 7A:
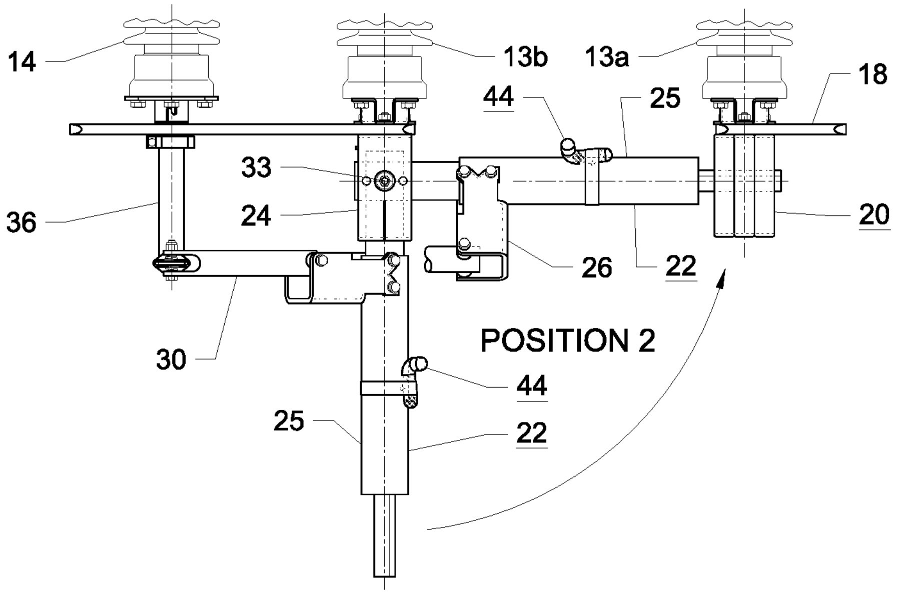
FIG. 7A is the same as FIG. 4A but showing the switch instead in an open position and the intermediate closed position.
Figure 7B:
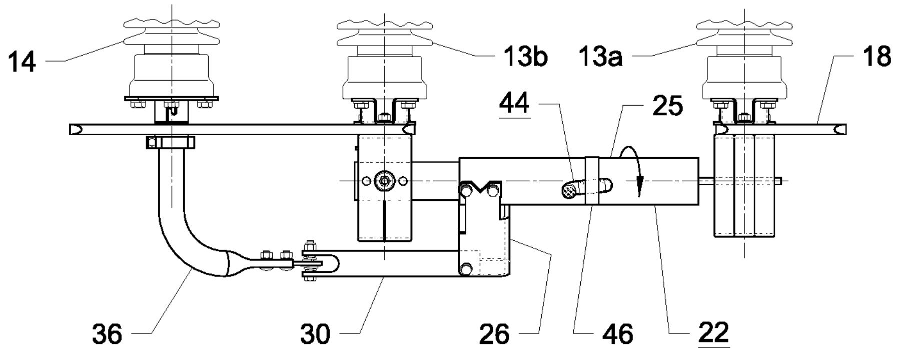
FIG. 7B is the same as FIG. 4A showing the switch in the full closed position.
Figure 8C:
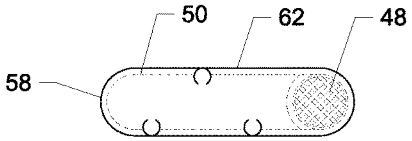
FIG. 8C is a plan view of the rollover indicator shown in FIG. 8A.
Figure 9C:
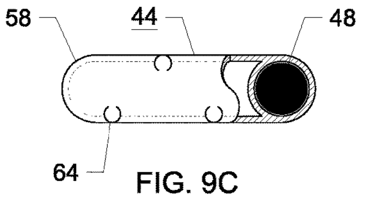
FIG. 9C is a plan view of the rollover indicator shown in FIG. 9A partially broken away.
Figure 8B:
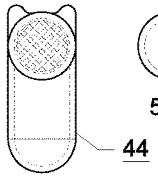
FIG. 8B is a side elevation view of the rollover indicator shown in FIG. 8A.
Figure 8A:
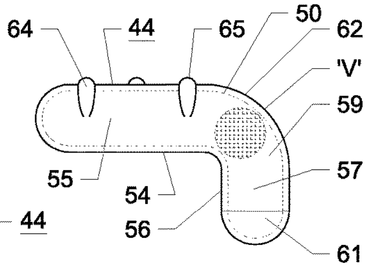
FIG. 8A is an elevation view of the rollover indicator of the present invention showing a hidden pathway and the ball in the intermediate position.
Figure 9B:
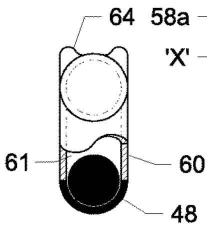
FIG. 9B is a side elevation view of the rollover indicator shown in FIG. 9A partially broken away.
Figure 9A:
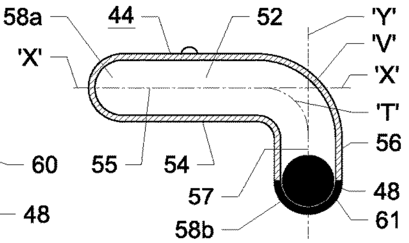
FIG. 9A is an elevation view of the rollover indicator partially broken away showing the final position 3 of ball for the switch shown in FIG. 6B.
Figure 10:
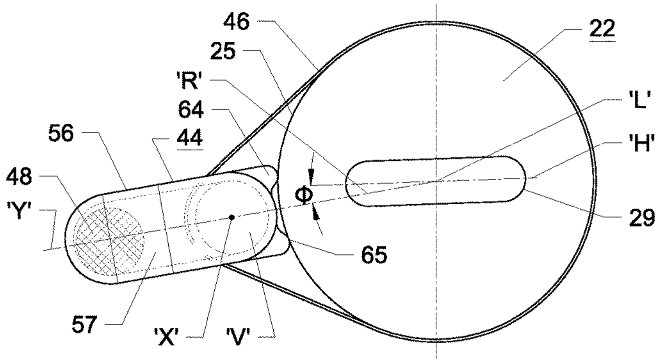
FIG. 10 is an enlarged elevation view of the rollover indicator strapped to the switch blade as shown in FIG. 2.

The housing 52 is mounted to the horizontal movable switch blade 25 as shown, for example, in FIG. 1A. The first closed end 58 of the housing 52 is positioned nearest the hinge assembly 24 end 31 of the horizontally mounted vertical break disconnect switch 10 in a top mounted installation, i.e., where the insulators are below the blade assembly 22, such as shown in FIG. 1A. In this type of switch installation, the ball 48 stays in the long portion 55 of the hidden pathway 50 in the long leg 54 until the blade tip 29 has reached the proper angle of closure in the first switch operation indicating proper depth in the mating contact, i.e., by initial contact with break jaw stop 38, as shown in FIG. 5B, for example, which is at the intermediate closing position of the switch. The ball 48 at that point will roll only to the vertex 'V' between the long portion 55 and the intersecting perpendicular short portion 57 of the hidden pathway 50, between the two legs 54, 56 of the "L-shaped" housing, but still is not visible, as shown in FIGS. 8A-8C. The pathway 50 in the area of the vertex ' V' may include an arc section 59 having an axis defined by a radius 'T' tangent to both axis 'X' and axis 'Y' as shown in FIG. 9A. The ball only becomes visible in the window 61 after the blade tip 29 is caused to completely roll over, i.e., about the longitudinal axis 'L' of the switch blade assembly 22 in the second switch closing operation, as shown in FIGS. 9A, 9B, and 9C. The ball 48 will stay at the vertex 'V' in the arc section 59 until the proper angle of rollover is reached that causes the axis 'Y' of the short portion 57 of the hidden pathway 50 to tilt downhill so that gravity now causes the ball to roll in the short portion 57. As can be seen in FIG. 10, indicator 44 is mounted to the switch-blade assembly 22 so that the longitudinal axis 'Y' of the short portion 57 is co-linear with the radius 'R' of the tubular switch-blade assembly 22 as shown in FIG. 10. The short portion 57 therefore extends perpendicular to the circumference of switch blade 25 as shown in FIG. 2. The housing 52 is also positioned on the blade 25 such that the longitudinal axis 'Y' of the short portion 57 is offset by a second predetermined angle $\phi$ of about 0.25 to about 1.50 degrees below the horizontal axis or plane 'H' passing through the flat blade tip 29, as shown in FIG. 10, when the blade tip 29 is in the fully closed position such as shown in FIG. 2. In this position the ball 48 due to gravity will roll to a second closed indicator end 60 of the housing 52 in the short leg 56 and be visible through the transparent or translucent integral window 61 to the utility operator, if such a window is provided. This same position detector and rollover indicator 44, as mentioned, will also work for an underhung horizontally mounted vertical break switch 10 as shown in FIGS. 4A, 4B, 4C and 4D i.e., where the insulators are arranged above the blade assembly 22. This is true as long as the first closed end 58 of the housing 52 in long leg 54 points away from the hinge assembly 24 of switch 10. The indicator 44 for an underhung horizontally mounted vertical break switch 10 is also desirably operatively attached to the switch blade 25 by a strap 46, as shown for example by reference to FIGS. 4A and 4D. A hose clamp such as a screw clamp may be used as the strap 46. The long leg, i.e., first leg, 54 of the "L-shaped" indicator 44 having the longitudinal axis 'X' arranged at the first predetermined angle $\theta$ with respect to the longitudinal axis 'L' of the switch-blade assembly 22 as shown in FIG. 4D. The first predetermined angle $\theta$ may be the same as mentioned for the top mounted switch as being about 0.50 to about 1.50 degrees. For the underhung horizontally mounted vertical break switch 10 the short portion 57 of the indicator 44 also extends perpendicular to the circumference of switch blade 25 under the same constraints as described for the top mounted switch arrangement shown in FIG. 10. FIGS. 7A and 7B show the movement of the switch-blade assembly 22 through the initial vertical Position 1 to the intermediate Position 2, i.e., the first switch closing operation, to the final full closed Position 3, i.e., the second switch closing operation, in the same manner as described previously for FIGS. 6A and 6B for the top mounted switch configuration.

In one embodiment, the outside surface 62 of the housing 52 is preferably shaped to allow it to be strap clamped to any horizontally mounted vertical break disconnect switch blade 25 and allow it to be adjusted to cause the ball to become visible in the window only when both the proper angle of closure and the proper angle of rollover are met as previously discussed. The housing 52 is preferably provided with supports 64 which may be three protuberances, for example, on the housing 52 as shown in FIGS. 8A, 8B, 8C and 10. The protuberances 64 each having foot portions 65 for contacting the switch blade 25. With the supports or protuberances 64 any radius of the tubular switch blade 25 can be accommodated. The strap clamp 46 to attach the indicator 44 may be a stainless steel strap such as a common hose clamp whose position on the blade 25 can be adjusted by tightening with a screw driver or nut drive tool.

Figure 11A:
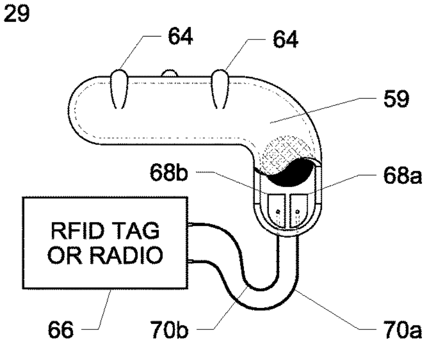
FIG. 11A is a schematic plan view of a rollover indicator connected to an RFID TAG or radio of the present invention.
Figure 11B:
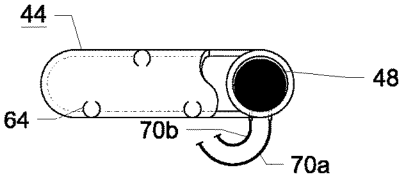
FIG. 11B is a bottom view of the rollover indicator shown in FIG. 11A.

The blade position and rollover indicator 44 may alternatively be a self-sensing system instead of or in addition to a visible indicator; by adding, for example, an RFID tag 66 to it. This aspect of the invention would include incorporating an RFID tag which may be a switchable RFID tag such as disclosed in U.S. Pat. No. 8,451,098 B2 by Josua Posamentier, issued May 28, 2013, and assigned to Intel Corporation of Santa Clara, Calif. The RFID tag 66 includes a pair of electrical contacts 68*a*, 68*b* which are connected in electrical circuit to the conductors 70*a*, 70*b*, as shown in FIGS. 11A and 11B. Using the RFID tag, when the ball, preferably made of a electrically conductive metal, such as, stainless steel, is rolling in the hidden pathway reaches the final closed correct position, it will close the circuit between the conductors 70*a*, 70*b* and allow the tag to energize and show as a "read" by a reader mounted below at ground level (not shown in the drawings). The ball 48 in any other position would preclude reception of power from the reader and therefore not return a coded message. The reader would then drive a status indicator, not shown, in a control room, not shown, to show whether proper closure of the switch 10 was achieved or not. Alternatively, the above indicator 44 could be read by means of a radio arrangement. A low wattage battery powered radio transmitter integrated into the indicator 44 could detect contact closure as the ball rolls to its final position and relay that information to a receiver in a control room (not shown). Also, fiber optics to detect the ball and relay that information to the control room is another alternative (not shown). As mentioned the window 61 for these embodiments of the invention, may not be necessary, but still may be desirable to permit visual inspection of the indicator.

Figure 12:
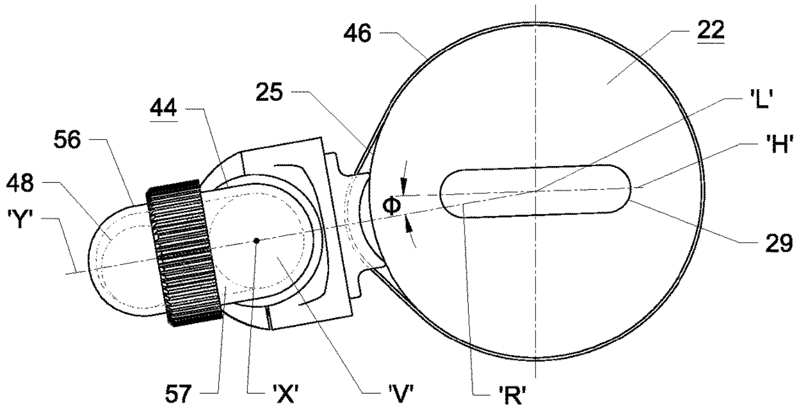
FIG. 12 is similar to FIG. 10, but shows an adjustable mounting bracket supporting a housing without protuberances.
Figure 13:
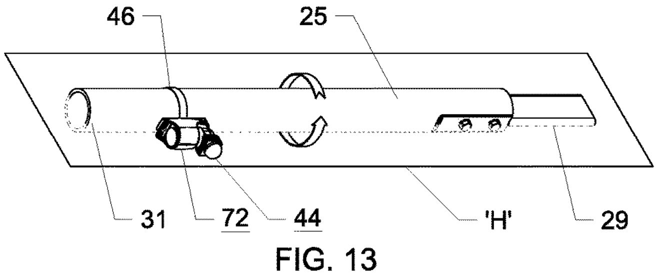
FIG. 13 is a perspective view of a switch blade in relationship to a horizontal plane carrying the blade position and rollover indicator mounted near the hinge end for a counter clockwise to open vertical break disconnect switch.
Figure 14:
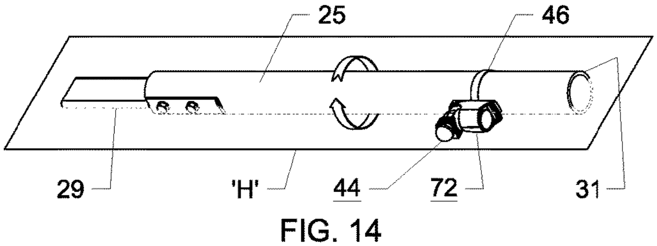
FIG. 14 is the same as FIG. 13 but showing a switch blade in relationship to a horizontal plane carrying the blade position and rollover indicator mounted near the hinge end for a clockwise to open vertical break disconnect switch.
Figure 17:
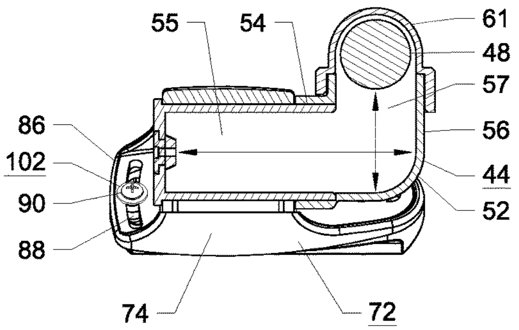
FIG. 17 is a perspective view partially broken away showing the interior of the blade position and rollover indicator carried by the adjustable mounting bracket assembly; and, FIG. 18 is similar to FIG. 1D, but the blade position and rollover indicator of FIG. 1D having a housing with protuberances has been replaced by an adjustable mounting bracket assembly supporting a housing without protuberances.
Figure 16D:
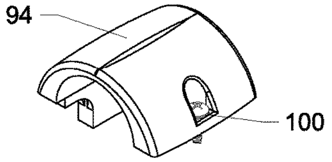
FIG. 16D is a perspective view of the upper bracket of the adjustable mounting bracket assembly.
Figure 16C:
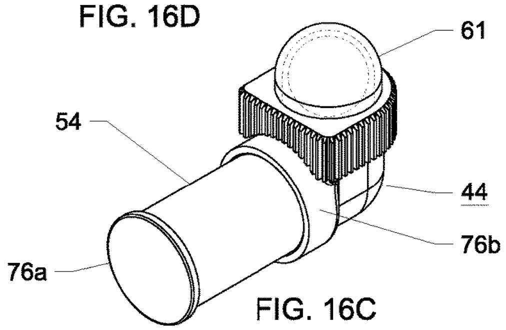
FIG. 16C is a perspective view of the blade position and rollover indicator for the adjustable mounting bracket assembly.
Figure 16B:
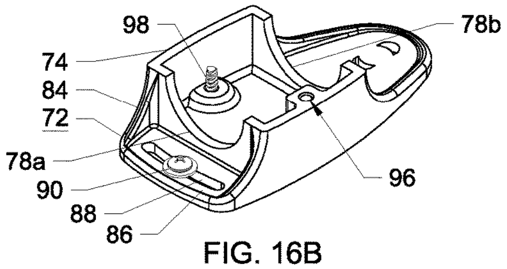
FIG. 16B is a perspective view of the saddle bracket of the adjustable mounting bracket assembly.
Figure 15B:
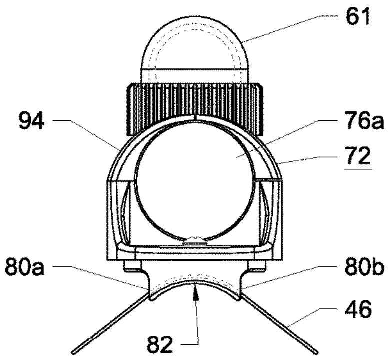
FIG. 15B is an end elevation view of the blade position and rollover indicator as shown in FIG. 15A.
Figure 16A:
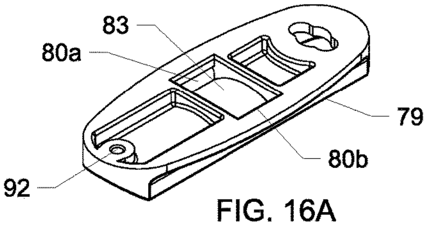
FIG. 16A is a perspective view of the base bracket of the adjustable mounting bracket assembly.

In another embodiment, instead of the housing 52 being strap clamped directly to a horizontally mounted vertical break disconnect switch blade 25 via protuberances 64, an adjustable mounting bracket assembly 72 is provided to support and position the housing 52 without protuberances, to easily mount and adjust the blade position and rollover indicator 44, as shown in FIG. 17. The adjustable mounting bracket assembly 72 as shown in FIGS. 12, 13 and 14 is strapped clamped to the horizontally mounted vertical break disconnect switch blade 25 of switch-blade assembly 22. The blade position and rollover indicator 44, as shown in FIGS. 15A, 15B, 15C and 15D, is mounted to the adjustable mounting bracket assembly 72. The adjustable mounting bracket assembly 72 includes a saddle bracket 74 for receiving the long leg 54 of the housing 52, see FIGS. 16B and 16C. The long leg 54 is provided with attached stop members 76*a*, 76*b* which respectively engage end walls 78*a*, 78*b* of the saddle bracket 74 in the operative position, to prevent the long leg 54 from moving axially with respect to the saddle bracket 74. As can be seen from FIGS. 15D, 16B and 16C, the long leg 54 with stops 76*a*, 76*b* sits securely in the saddle bracket 74. With reference to FIGS. 16*a* and 16*b*, the saddle bracket 74 is mounted to a base bracket 79. The base bracket 79 is provided with oppositely disposed strap slots 80*a*, 80*b* for receiving the strap 46 which passes through slots 80*a* and 80*b* and is strap clamped to the switch blade 25. The base bracket 79 may include a curved bottom portion 82 which between the strap slots 80*a*, 80*b* provides an upper curved surface 83 that will prevent kinking or binding of the strap clamp 46. The bottom portion 82 of the adjustable mounting bracket assembly 72 is provided with a curvature that approximates the curvature of the switch blade 25, as shown in FIG. 12. The saddle bracket 74 also includes a lip portion 86 at the front 84 thereof having an adjustment slot 88 of predetermined dimensions such as 0.16 inches by 1.00 inch, for example, for receiving an adjustment screw 90.

A first adjustor arrangement 102 has the adjustment screw 90 passing through the adjustment slot 88 and engaging a first aperture 92 in the base bracket 79. The adjustment screw 90 may be loosened for adjustment of the longitudinal 'X' axis of the long portion 55 of hidden pathway 50 relative to the longitudinal 'L' axis of the switch-blade assembly 22 in a similar manner as described for the previous embodiment of the blade position and rollover indicator 44 with the housing 52 having protuberances 64. This is accomplished by rotating the saddle bracket 74 relative to the base bracket 79 in the direction of arrows 'A'-'A' shown in FIG. 15D. With the long leg 54 seated in the saddle bracket 74 the upper bracket 94 is placed over the long leg 54. A second adjuster arrangement 104 has the upper bracket having an aperture not shown in the drawings which engages with saddle pin 98, while saddle screw 100 engages second aperture 96 in the saddle bracket 74, the long leg 54 sits between the saddle pin 98 and the saddle screw 100. The screw 100 may be loosened for adjustment, i.e., by rotation of the longitudinal axis 'Y' of the short portion 57 of the pathway 50 relative to axis 'R' of the elongated switch blade assembly 22, as shown by arrows 'B'-'B' in FIG. 15, in a similar manner as described for the previous embodiment of the blade position and rollover indicator 44 with the housing 52 having protuberances 64.

Figure 18:
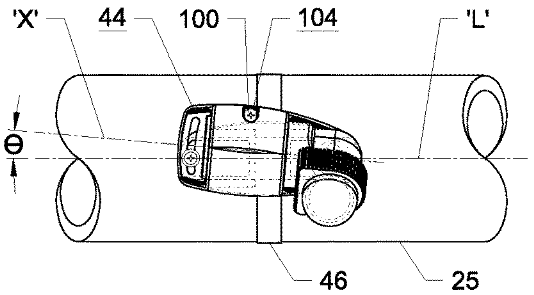
Figure 15D:
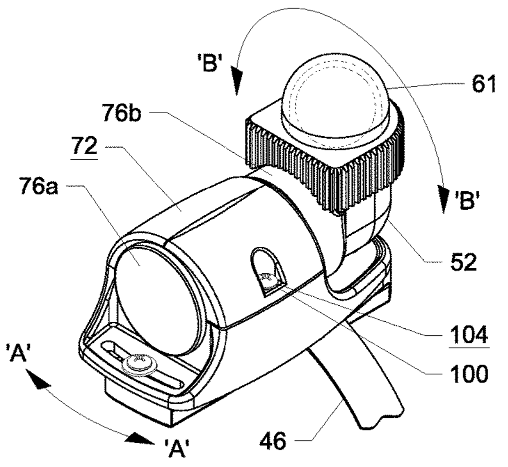
FIG. 15D is a perspective view of the blade position and rollover indicator as shown in FIG. 15A.
Figure 15C:
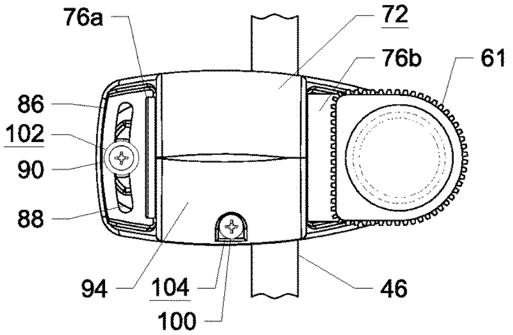
FIG. 15C is a plan view of the blade position and rollover indicator as shown in FIG. 15A.
Figure 15A:
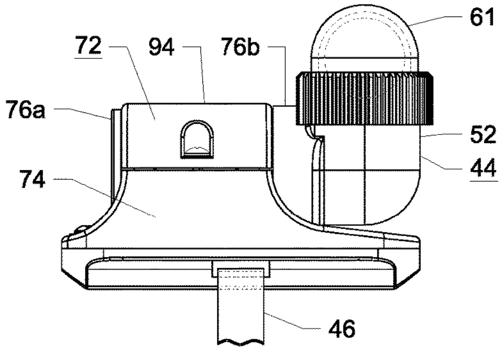
FIG. 15A is a side elevation view of the blade position and rollover indicator mounted to an adjustable mounting bracket assembly.

As can be seen by reference to FIG. 13 the blade position and rollover indicator 44 is preferably strap clamped via the adjustable mounting bracket assembly 72 to the switch blade 25 as close as possible to the hinge assembly 24, not shown in FIG. 13, with window 61 towards the blade tip 29, when the blade 25 is in the final fully closed position with the horizontal axis or plane 'H' passing transversely through the blade tip 29 as shown in FIG. 12. The blade position and rollover indicator 44 is placed on the right side of the blade 25 as shown in FIG. 13, looking from the hinge end 31 towards the blade tip 29, if the blade 25 rotates counter clockwise to open, shown by the arrow in FIG. 13. The blade position and rollover indicator 44 is placed on the left side of the blade 25, if the blade 25 rotates clockwise to open as shown by the arrow in FIG. 14. Once the adjustable mounting bracket assembly 72 holding the blade position and rollover indicator 44 is properly strap clamped via clamp 46 by tightening a clamp screw, not shown in the drawings, to the blade 25, both the adjustment screw 90 and the saddle screw 100 are then loosened. The short leg 56 is rotated upward until the ball 48 is not visible in the viewing window 61. The long leg 54 is then rotated to force ball 48 to roll to the closed-end 58 of the long leg 54. The long leg 54 is slowly rotated by moving saddle bracket 74 relative to base bracket 79, with the adjustment screw 90 loosened, in the direction to the point where the ball 48 just rolls to vertex 'V' as shown in FIG. 8A, for example, which is at the intermediate closing position of the switch, see FIG. 18 which is the equivalent of FIG. 1D for the first embodiment. The adjustment screw 90 is tightened in the adjustment slot 88 to retain the long leg 54 so that the longitudinal axis 'X' of the long leg 54 is at the predetermined angle $\theta$ from the longitudinal axis 'L' of switch blade assembly 22, as described previously. The short leg 56 is rotated slowly until the ball 48 rolls to viewing window 61 indicating complete rollover of the blade contact tip 29 between the oppositely disposed break jaw contact fingers 42*a*, 42*b* where the longitudinal axis 'Y' of the short leg 56 is at the predetermined angle $\phi$ from the horizontal axis or plane 'H' passing through the blade tip 29, as shown in FIG. 12. The remaining saddle screw 100 is tightened to retain the short leg 56 at the predetermined angle $\phi$. The blade 25 is then opened and slowly closed to verify correct adjustment of the blade position and rollover indicator 44. The ball 48 should only appear in the viewing window 61 after the blade tip 29 has completely bottomed in the break-jaw contact assembly 20, as shown in FIG. 2, for example, and has reached the last 2° or 3° of final rollover. Of course, with this embodiment the self-sensing system may also used instead of or in addition to a visible indicator as already previously described.

Of course variations from the foregoing embodiments are possible without departing from the scope of the invention.

What is claimed is:

1. In combination with a horizontally mounted high voltage vertical break disconnect switch, said high voltage vertical break disconnect switch including three vertical insulators in operative arrangement on a horizontal beam, the drive arrangement including a rotatable support assembly including one of the vertical insulators being rotatable and a lever for imparting rotation to the one rotatable insulator, an elongated movable switch-blade assembly in operative connection with the drive arrangement, the elongated movable switch-blade assembly including an elongated switch blade, the drive arrangement including a hinge assembly, one end of the elongated switch blade in operative connection with the hinge assembly, the other end of the elongated switch blade having operatively attached thereto a switch blade contact portion, a break jaw contact assembly operatively attached to one of the other of the vertical insulators, the break jaw contact assembly including a pair of oppositely disposed contact jaws, a break jaw stop operatively disposed between the oppositely disposed contact jaws, the switch blade contact portion in electrical contact relationship with the oppositely disposed contact jaws in a switch full closed position and the switch blade contact portion out of electrical contact with the break jaw contact assembly in a switch full open position, in a first switch closing operation from the switch full open position the drive arrangement for imparting to the elongated movable switch-blade assembly a rotational vertical movement pivoting about the hinge assembly for an intermediate closing of the switch upon the switch blade contact portion first contacting the break jaw stop or for full opening of the switch, the drive arrangement also for imparting a rotational movement to the elongated movable switch-blade assembly with respect to the longitudinal axis thereof upon the intermediate closing of the switch for enabling final closing of the switch by orienting the switch blade contact portion horizontally and in a full pressure contact arrangement between the oppositely disposed contact jaws upon a complete rollover of the elongated switch blade, the improvement which comprises:

a blade position detector and rollover indicator affixed to the elongated switch blade in predetermined position, the blade position detector and rollover indicator including a housing of predetermined shape and size enclosing therein a substantially hidden pathway, a spherical ball in operative arrangement with the pathway for rolling movement within and along the pathway, the blade position detector and rollover indicator for reacting by causing the ball to roll within the pathway due to gravitational force to a predetermined position in the pathway when a proper angle of closure of the elongated movable switch-blade assembly is obtained at the intermediate closing of the switch in a first switch closing operation and by further causing the ball to roll within the pathway to an indicator end of the pathway when a complete rollover of the elongated movable switch-blade assembly is obtained at the full closing of the switch in a subsequent second switch closing operation, means for indicating the occurrence of the complete rollover of the elongated switch blade.

2. The combination of claim 1, wherein the housing has an L-shape and including a first leg and a second leg, the L-shaped housing having the pathway therein including a first leg portion enclosed by the first leg of the housing and a second leg portion enclosed by the second leg of the housing, the first leg portion and the second leg portion of the pathway in substantially perpendicular and intersecting relationship, the first leg having a first closed end and the second leg having a second closed indicator end, the first closed end and the second closed indicator end defining opposite ends of the pathway, the second leg portion of the pathway proximate the second closed indicator end including the means for indicating the occurrence of the complete rollover of the elongated switch blade including at least two of a window and a ball and an electronic ball detector-transmitter operatively arranged in the housing, the pathway including a vertex between the first leg portion and the second leg portion, the first leg portion of the housing affixed to the elongated switch-blade assembly at a first predetermined angle between the longitudinal axis of the first leg portion of the pathway and the longitudinal axis of the elongated movable switch-blade assembly, and the longitudinal axis of second leg portion of the housing operatively arranged with the elongated switch blade, whereby when the elongated movable switch-blade assembly is initially in the full open position and caused to move by the drive arrangement to the intermediate closed position the spherical ball will roll due to gravity to the vertex of the pathway and stop until the drive arrangement further causes the elongated movable switch-blade assembly to rollover, thereby causing the ball to roll to the second closed indicator end to be in position for indicating the switch is in the full closed position fully engaged between the oppositely disposed contact jaws.

3. The combination of claim 2, wherein the ball is made of an electrically conductive material.

4. The combination of claim 3, wherein the electronic ball detector-transmitter comprises an RFID tag or radio including a pair of conductors operatively arranged in the pathway at the second closed indicator end for electrically contacting the spherical ball, the RFID or radio in operative communication respectively with a reader or receiver upon the spherical ball contacting the pair of conductors for electrically automatically communicating the switch is in the full closed position.

5. The combination of claim 3, wherein the ball is made of stainless steel.

6. The combination of claim 2, the first leg of the housing is affixed to the elongated switch blade such that the longitudinal axis of the first leg portion of the pathway is offset by a first predetermined angle of about 0.5 degrees to about 1.5 degrees from the longitudinal axis of the elongated movable switch-blade assembly.

7. The combination of claim 2, wherein the pathway includes an arc section in operative connection between the first leg portion and the second leg portion of the pathway.

8. The combination of claim 7, wherein the arc section is defined by a radius tangent to the longitudinal axes of the first leg portion and the second leg portion.

9. The combination of claim 2, wherein the electronic ball detector-transmitter comprises a fiber optic cable arranged in the pathway at the second closed indicator end for optically detecting the spherical ball has reached the second closed indicator end of the pathway, the fiber optic cable operatively connected to a fiber optic media converter to further communicate to a status indicator in a remote location that the switch has switched to the full closed position.

10. The combination of claim 2, wherein the outer surface of the first leg of the housing includes a plurality of protuberances each having a foot portion for contacting the elongated switch blade.

11. The combination of claim 2, wherein the window is an opening or a transparent area or a translucent area in the housing at the second closed indicator end.

12. The combination of claim 2, wherein the ball is made of glass.

13. The combination of claim 2, wherein the first leg is longer than the second leg and the first leg portion is longer than the second leg portion.

14. The combination of claim 2, wherein the longitudinal axis of the second portion of the pathway is offset below a horizontal axis of the switch blade contact portion by a second predetermined angle of from about 0.25 degrees to about 1.50 degrees.

15. The combination of claim 2, further including an adjustable mounting bracket assembly in operative supportive arrangement with the blade position and rollover indicator housing, the adjustable mounting bracket assembly affixed to the elongated switch blade in predetermined position and comprises a saddle bracket in operative supportive arrangement with the first leg of the housing of the blade position and rollover indicator, a base bracket affixed to the elongated switch blade and in operative supportive arrangement with the saddle bracket, an upper bracket releasably attached to the saddle bracket and in operative clamping arrangement with the first leg of the housing, a first adjustor arrangement operatively arranged between the base bracket and the saddle bracket for permitting adjustment of the longitudinal axis of the first leg portion of the first leg of the housing relative to the longitudinal axis of the switch blade at the predetermined angle of closure of the elongated movable switch-blade assembly, and a second adjustor arrangement operatively arranged between the base bracket and the saddle bracket for permitting adjustment of the longitudinal axis of the second leg portion of the second leg of the blade position detector rollover indicator relative to the horizontal axis of the switch blade tip when in the intermediate closing position of the switch for permitting the ball to roll to the second closed indicator end upon the occurrence of the complete rollover of the elongated switch-blade assembly.

16. The combination of claim 15, wherein the first adjustor arrangement includes the saddle bracket having a lip portion having an adjustment slot therethrough, the base bracket having a first threaded aperture therein in operative alignment with the adjustment slot, an adjustment screw passing through the adjustment slot and operatively engaging the first threaded aperture.

17. The combination of claim 15, wherein the second adjustor arrangement includes the saddle bracket having a second threaded aperture therein, the upper bracket having an upper bracket aperture therethrough in operative alignment with the second threaded aperture, a saddle screw passes through the upper bracket aperture and operatively engages the second threaded aperture.

18. The combination of claim 17, wherein the base bracket further includes oppositely disposed strap slots for receiving a strap clamp.

19. The combination of claim 18, wherein the base bracket has a curved bottom portion having an upper curved surface.

20. The combination of claim 19, wherein the curved bottom portion has a lower curved surface.

21. The blade position detector and rollover indicator of claim 19, wherein the curved bottom portion has a lower curved surface.

22. The blade position detector and rollover indicator of claim 18, wherein the base bracket has a curved bottom portion having an upper curved surface.

23. The blade position detector and rollover indicator of claim 17, wherein the base bracket further includes oppositely disposed strap slots for receiving a strap clamp.

24. The combination of claim 1, wherein housing is weatherproof.

25. The combination of claim 1, wherein the housing is made of plastic or glass or metal.

26. The combination of claim 1, wherein the elongated movable switch-blade assembly is operatively arranged above the vertical insulators.

27. The combination of claim 1, wherein the elongated movable switch-blade assembly is operatively arranged below the vertical insulators.

28. The combination of claim 1, wherein the elongated switch blade of the elongated movable switch-blade assembly is tubular.

29. The combination of claim 1, wherein the switch blade contact portion is substantially flat.

30. The combination of claim 1, where in the break jaw contact assembly is U-shaped.

31. A blade position detector and rollover indicator for a horizontally mounted high voltage vertical break disconnect switch, said high voltage vertical break disconnect switch including three vertical insulators in operative arrangement on a horizontal beam, the drive arrangement including a rotatable support assembly including one of the vertical insulators being rotatable and a lever for imparting rotation to the one rotatable insulator, an elongated movable switch-blade assembly in operative connection with the drive arrangement, the elongated movable switch-blade assembly includes an elongated switch blade, the drive arrangement including a hinge assembly, one end of the elongated movable switch-blade assembly in operative connection with the hinge assembly, the other end of the elongated switch blade having a switch blade contact portion attached thereto, a break jaw contact assembly operatively attached to one of the other of the vertical insulators, the break jaw contact assembly including a pair of oppositely disposed contact jaws, a break jaw stop operatively disposed between the contact jaws, the switch blade contact portion in electrical contact relationship with the oppositely disposed contact jaws in a switch full closed position and the switch blade contact portion out of electrical contact relationship with the break jaw contact assembly in a switch full open position, in a first switch closing operation from the full open position the drive arrangement for imparting to the elongated movable switch-blade assembly a rotational vertical movement pivoting about the hinge assembly for an intermediate closing upon the switch blade contact portion first contacting the break jaw stop or for full opening of the switch, the drive arrangement also for imparting a rotational movement to the elongated movable switch-blade assembly with respect to the longitudinal axis thereof upon intermediate closing of the switch for enabling final closing of the switch by orienting the switch blade contact portion horizontally and in a full pressure contact arrangement between the oppositely disposed contact jaws upon a complete rollover of the elongated switch blade, said blade position detector and rollover indicator comprising:

a housing of predetermined shape and size enclosing therein a substantially hidden pathway, a spherical ball in operative arrangement with the pathway for rolling movement within and along the pathway, the blade position detector and rollover indicator for reacting by causing the ball to roll within the pathway due to gravitational force to a predetermined position in the pathway when a proper angle of closure of the elongated movable switch-blade assembly is obtained at the intermediate closing of the switch in a first switch closing operation and by further causing the ball to roll within the pathway to an indicator end of the pathway when a complete rollover of the elongated movable switch-blade assembly is obtained at the full closing of the switch in a subsequent second switch closing operation, means for indicating the occurrence of the complete rollover of the elongated switch blade.

32. The blade position detector and rollover indicator of claim 31 further comprising:

the housing has an L-shape and including a first leg and a second leg, the L-shaped housing having the pathway therein including a first leg portion enclosed by the first leg of the housing and a second leg portion enclosed by the second leg of the housing, the first leg portion and the second leg portion of the pathway in substantially perpendicular and intersecting relationship, the first leg having a first closed end and the second leg having a second closed indicator end, the first closed end and the second closed indicator end defining opposite ends of the pathway, the second leg portion of the pathway proximate the second closed indicator end including the means for indicating the occurrence of the complete rollover of the elongated switch blade including at least two of a window and a ball and an electronic ball detector-transmitter operatively arranged in the housing, the pathway including a vertex between the first leg portion and the second leg portion, the first leg portion of the housing affixed to the elongated switch-blade assembly at a first predetermined angle between the longitudinal axis of the first leg portion of the pathway and the longitudinal axis of the elongated movable switch-blade assembly, and the axis of second leg portion of the housing operatively arranged with the elongated switch blade, whereby when the elongated movable switch-blade assembly is initially in the full open position and caused to move by the drive arrangement to the intermediate closed position the spherical ball will roll due to gravity to the vertex of the pathway and stop until the drive arrangement further causes the elongated movable switch-blade assembly to rollover, thereby causing the ball to roll to the second closed indicator end to be in position for indicating the switch is in the full closed position fully engaged between the oppositely disposed contact jaws.

33. The blade position detector and rollover indicator of claim 32, wherein the pathway includes an arc section in operative connection between the first leg portion and the second leg portion.

34. The blade position detector and rollover indicator of claim 33, wherein the arc section is defined by a radius tangent to axis of the first leg portion and the second leg portion.

35. The blade position detector and rollover indicator of claim 32, wherein the electronic ball detector-transmitter comprises a fiber optic cable arranged in the pathway at the one end of the second leg portion for optically detecting the spherical ball has reached the one end of the short leg portion of the pathway, the fiber optic cable operatively connected to a fiber optic media converter to further communicate to a status indicator in a remote location that the switch has switched to the full closed position.

36. The blade position detector and rollover indicator of claim 32, wherein the outer surface of the long leg of the housing includes a plurality of protuberances each having a foot portion for contacting the elongated movable switch-blade assembly.

37. The blade position detector and rollover indicator of claim 32, wherein the window is an opening or a transparent area or a translucent area in the housing at the second closed indicator end.

38. The blade position detector and rollover indicator of claim 32, wherein the first leg is longer than the second leg and the first leg portion is longer than the second leg portion.

39. The blade position detector and rollover indicator of claim 32, wherein the longitudinal axis of the second portion of the pathway is offset below a horizontal axis of the switch blade contact portion by a second predetermined angle of from about 0.25 degrees to about 1.50 degrees.

40. The blade position detector and rollover indicator of claim 32, further including an adjustable mounting bracket assembly in operative supportive arrangement with the blade position and rollover indicator housing, the adjustable mounting bracket assembly affixed to the elongated switch blade in predetermined position and comprises a saddle bracket in operative supportive arrangement with the first leg of the housing of the blade position and rollover indicator, a base bracket affixed to the elongated switch blade and in operative supportive arrangement with the saddle bracket, an upper bracket releasably attached to the saddle bracket and in operative clamping arrangement with the first leg of the housing, a first adjustor arrangement operatively arranged between the base bracket and the saddle bracket for permitting adjustment of the longitudinal axis of the first leg portion of the first leg of the housing relative to the longitudinal axis of the switch blade at the predetermined angle of closure of the elongated movable switch-blade assembly, and a second adjustor arrangement operatively arranged between the base bracket and the saddle bracket for permitting adjustment of the longitudinal axis of the second leg portion of the second leg of the blade position detector rollover indicator relative to a horizontal axis of the switch blade tip when in the intermediate closing position of the switch for permitting the ball to roll to the second closed indicator end upon the occurrence of the complete rollover of the elongated switch-blade assembly.

41. The blade position detector and rollover indicator of claim 32, wherein the first adjustor arrangement includes the saddle bracket having a lip portion having an adjustment slot therethrough, the base bracket having a first threaded aperture therein in operative alignment with the adjustment slot, an adjustment screw passing through the adjustment slot and operatively engaging the first threaded aperture.

42. The blade position detector and rollover indicator of claim 32, wherein the second adjustor arrangement includes the saddle bracket having a second threaded aperture therein, the upper bracket having an upper bracket aperture therethrough in operative alignment with the second threaded aperture, a saddle screw passes through the upper bracket aperture and operatively engages the second threaded aperture.

43. The blade position detector and rollover indicator of claim 31, wherein housing is weatherproof.

44. The blade position detector and rollover indicator of claim 31, wherein the housing is made of plastic or glass or metal.

45. The blade position detector and rollover indicator of claim 31, wherein the ball is made of an electrically conductive material.

46. The blade position detector and rollover indicator of claim 45, wherein the electronic ball detector-transmitter comprises an RFID tag or radio including a pair of conductors operatively arranged in the pathway at the one end of the second leg portion for electrically contacting the spherical ball, the RFID or radio in operative communication respectively with a reader or receiver upon the spherical ball contacting the pair of conductors for electrically automatically communicating the switch is in the full closed position.

47. The blade position detector and rollover indicator of claim 31, wherein the ball is made of glass.

48. The blade position detector and rollover indicator of claim 31, wherein the ball is made of stainless steel.

* * * * *